United States Patent [19]
Hannon et al.

[11] Patent Number: 6,150,635
[45] Date of Patent: Nov. 21, 2000

[54] SINGLE SERVING PIZZA COOKER

[76] Inventors: Georgia A. Hannon; Todd J. Hannon, both of 5611 381st Ave., Burlington, Wis. 53105

[21] Appl. No.: 09/264,114

[22] Filed: Mar. 8, 1999

[51] Int. Cl.[7] .................................................... F24C 7/10
[52] U.S. Cl. ........................... 219/386; 219/525; 99/426; 99/378; 99/389
[58] Field of Search ................................ 99/424–25, 439, 99/432, 436, 427, 372, 375, 377–78, 380; 219/386, 524–25; D7/362–63, 347, 364, 367

[56] References Cited

U.S. PATENT DOCUMENTS

| | | | |
|---|---|---|---|
| 3,814,005 | 6/1974 | Widdel | 99/349 |
| 3,886,290 | 5/1975 | Theimer et al. | 426/107 |
| 4,364,308 | 12/1982 | John et al. | 99/351 |
| 4,367,243 | 1/1983 | Brummet et al. | 426/303 |
| 4,498,376 | 2/1985 | Carey | 99/345 |
| 5,154,115 | 10/1992 | Kian | 99/380 |
| 5,253,565 | 10/1993 | Burton | 99/374 |
| 5,363,748 | 11/1994 | Boehm | 99/372 |
| 5,465,654 | 11/1995 | Lampi et al. | 99/422 |
| 5,523,104 | 6/1996 | Kirk | 426/523 |
| 5,586,488 | 12/1996 | Liu | 99/331 |
| 5,606,905 | 3/1997 | Boehm et al. | 99/375 |
| 5,809,871 | 9/1998 | Arathoon | 99/380 |
| 5,845,562 | 12/1998 | Deni | 99/375 |

*Primary Examiner*—Milton Cano
*Assistant Examiner*—Sherry A. Dauerman

[57] ABSTRACT

An electrical cooking device (10) for a single serving of pizza including a lower cooking plate (16) with peripheral walls (36) extending upward, hinged to a upper cooking plate (18) with peripheral walls (40) extending downward. When these are in a closed position a substantial cooking chamber (22) is formed in which up to a quarter of a round pizza of various thickness can be cooked easily and efficiently.

10 Claims, 6 Drawing Sheets

SINGLE SERVING PIZZA COOKER

BACKGROUND—FIELD OF INVENTION

This invention is a device for cooking foodstuffs, in particular a wedge, or single serving of pizza.

BACKGROUND—DESCRIPTION OF PRIOR ART

Pizza is one of the most popular foods eaten today. Over a billion pounds of pizza are consumed in the United States each year. It can also offer a nutritionally complete meal. There are numerous combinations to please everyone from every background, including young children, senior citizens, vegetarians, and even the most finicky eater. It can be very economical as it can be made from scratch, purchased in a vast price range, with every combination imaginable. Yet to make a serving for one person there isn't a fast, easy, or efficient way to do this.

Therefore there is a need to cook a single serving or one quarter of a whole pizza easily and with the quality of being oven baked.

Presently the best method to cook pizza is in a conventional oven. This creates many problems when only one serving is desired. Difficulties arise when cooking a quarter of a non frozen pizza as it would be necessary to cut and move the slice to a type of baking pan before placing it in the oven. This creates the problem of the sauce and toppings falling off as the dough is moved. Frozen pizza requires it to be placed directly on the oven rack to cook properly. When cooking only a single serving the disadvantage is the sauce and toppings would fall through the oven rack as the crust thaws thus becoming burnt in the oven. To prevent this from happening the pizza would have to be placed on a flat cooking surface which would prevent the crust from cooking properly. This also creates a danger that children could be burnt using a conventional oven. Another disadvantage is the energy waste both in heating a large oven and the heat it emits into the living space.

Pizza cookers—for example, U.S. Pat. No. 5,523,104 to Kirk (1996) and U.S. Pat. No. 5,586,488 to Liu (1996), both are made to cook a whole pizza, which does not solve the problem of a compact and energy efficient personal pizza cooker.

Another method to cook pizza would be in a microwave oven. The disadvantages are the pizza crust does not get brown and crisp and the cheese on top cooks to fast. U.S. Pat. No. 4,891,482 to Kirk (1990) a disposable microwavable container requires an additional purchase of a product to cook in and adds more waste to our present overburdened garbage system.

SUMMARY

The present invention provides a cooking device for foodstuffs, particularly pizza. It is comprised of an upper cooking plate with substantial peripheral walls extending downward and a lower cooking plate with somewhat less peripheral walls extending upward. These cooking plates are hinged and when in a closed position a cooking chamber is formed in which a wedge, up to one quarter of a whole round pizza of varying thickness can be cooked. It provides fast, efficient, and economical means of cooking a single serving of food.

The perimeter of the device is triangular, with two straight sides of equal length and the third side arcuate.

The device includes at least one heating element operatively coupled to the lower cooking plate which provides heat to the lower cooking plate and the cooking chamber. In the device the upper unit may also include a heating element to directly heat the upper cooking plate and add additional heat to the cooking chamber.

Objectives and Advantages

Accordingly, besides the objects and advantages of the cooking device described in my above patent, several objects and advantages of the present invention are:

(a) to cook up to a quarter of either a fresh or frozen pizza with conventional oven quality quickly and efficiently;

(b) to provide a safe method of cooking for all ages;

(c) it is also very economical to cook only a portion of a whole pizza as needed;

(d) to provide portability and minimal space for storage;

(e) to cook pizza or other food using only a small amount of energy;

(f) to minimize the amount of heat emitted into a room while cooking.

Further objects and advantages are to provide a cooking device that students could have in their college dorm rooms that is safe, economical, and takes a small amount of storage space.

DRAWING FIGURES

REFERENCE NUMERALS IN DRAWINGS

| | | | |
|---|---|---|---|
| 10 | cooking device | 12 | base unit |
| 14 | upper unit | 16 | lower cooking plate |
| 18 | upper cooking plate | 20 | hinges |
| 22 | cooking chamber | 24 | lower housing |
| 26 | bolts or screws | 28 | upper housing |
| 30 | flanges | 32 | heating element |
| 34 | upper heating element | 36 | bottom peripheral walls |
| 38 | lower cooling plate rim | 40 | upper peripheral walls |
| 42 | upper cooking plate rim | 44 | handle |
| 46 | electrical cord | | |

DETAILED DESCRIPTION OF THE INVENTION

Figure 1:
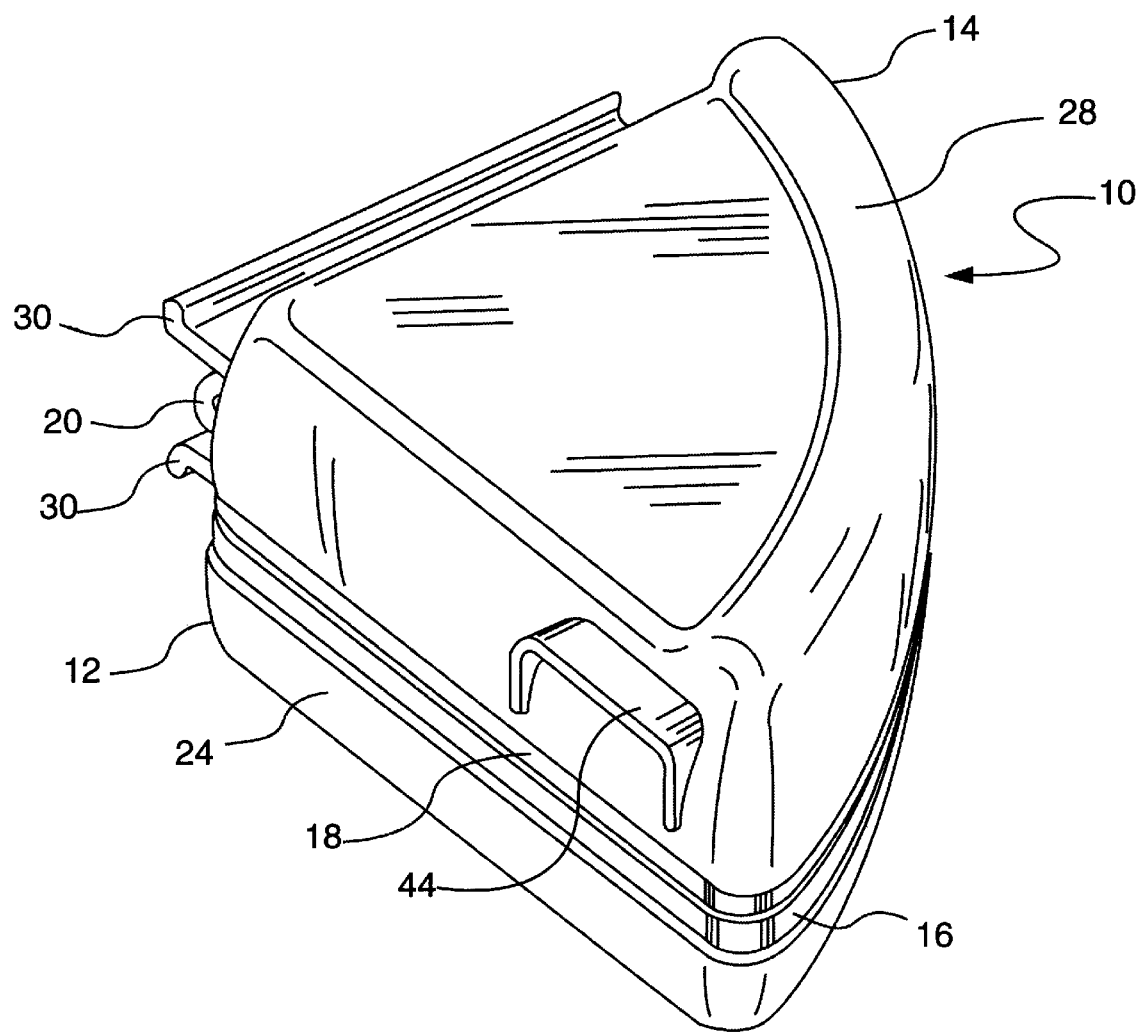
FIG. 1 is a perspective view of a preferred embodiment of the device of the present invention in a closed position.

FIG. 1 illustrates a preferred embodiment of a cooking device 10 constructed in accordance with the present invention. The apparatus 10 is generally triangular in shape, includes a base unit indicated at 12 and a upper unit indicated at 14.

Figure 2:
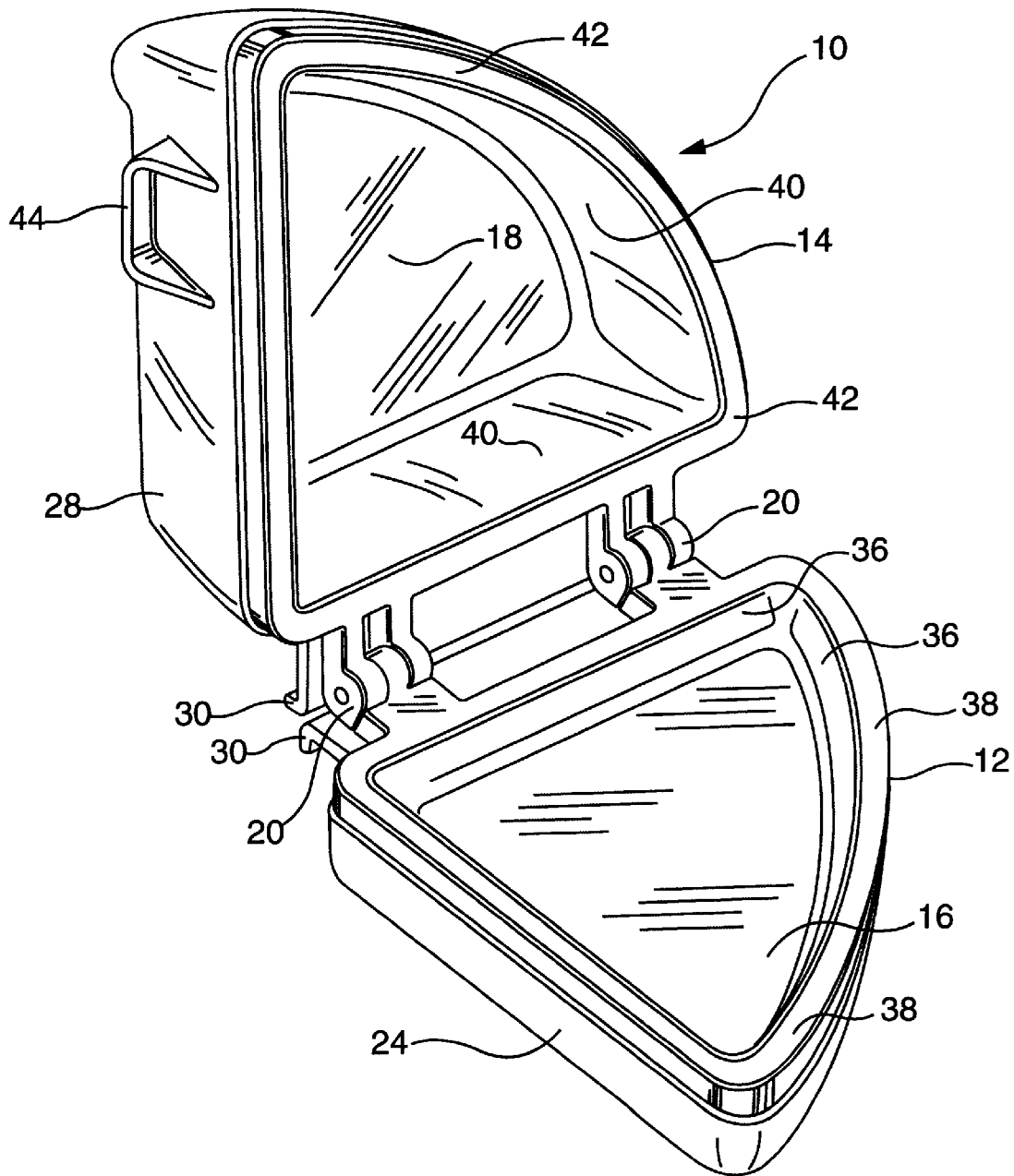
FIG. 2 is a perspective view of the device of FIG. 1 in an open position.
Figure 3:
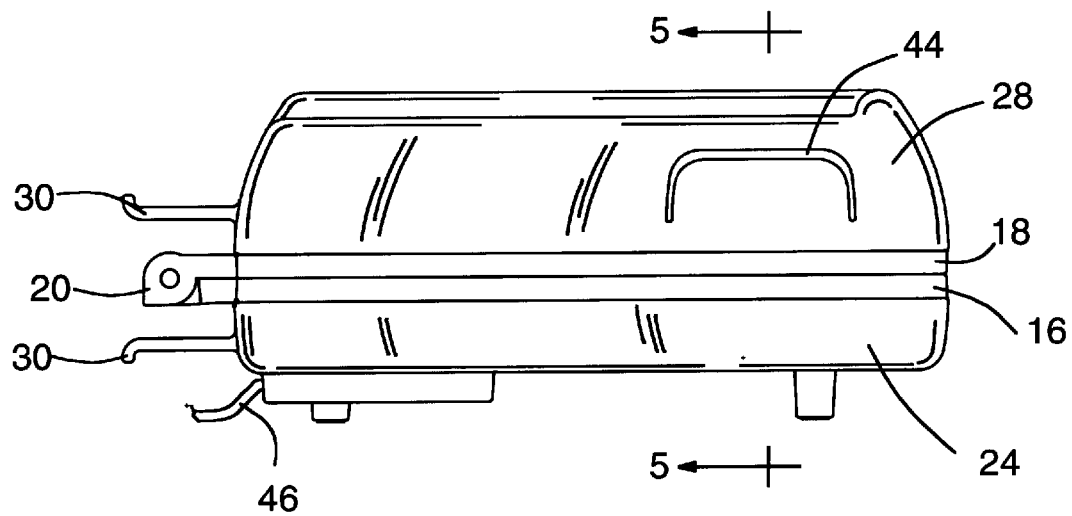
FIG. 3 is a front elevational view of the device of FIG. 1.
Figure 5:
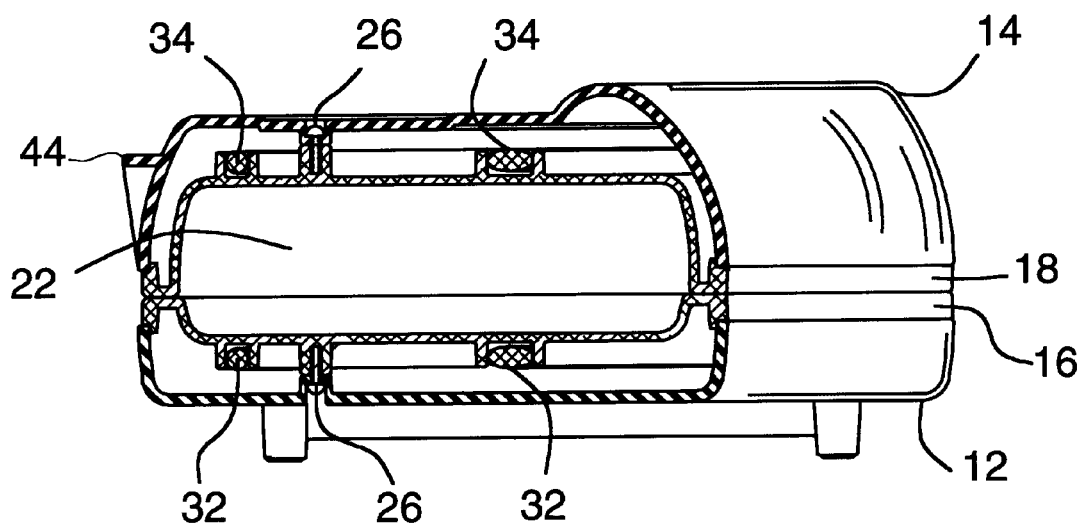
FIG. 5 is a sectional view taken along line 5 of FIG. 3.
Figure 8:
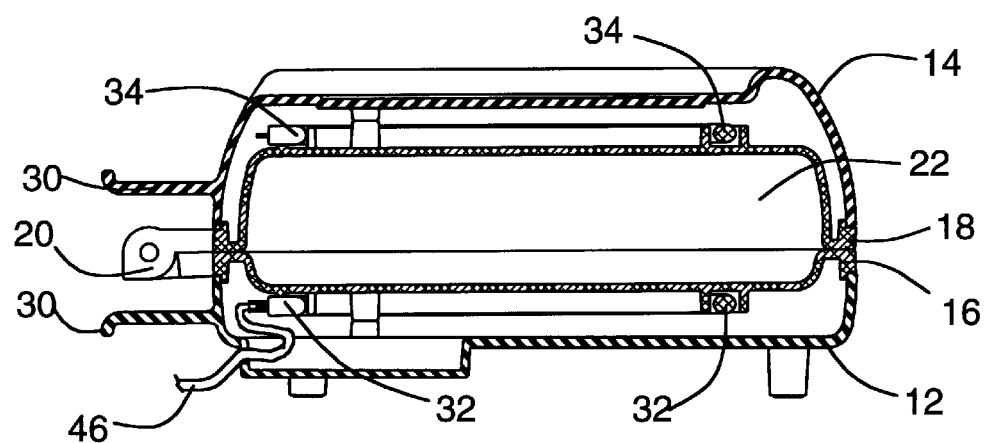
FIG. 8 is a sectional view taken along line 8 of FIG. 7.

Referring to FIG. 2 the base unit 12 includes a lower cooking plate 16. The upper unit 14 includes a upper cooking plate 18. The base unit 12 and the upper unit 14 are pivotally connected by a pair of hinges 20 being movable relative to the lower cooking plate 16 to a closed position in which the upper cooking plate 18 and the lower cooking plate 16 form a cooking chamber 22 (FIG. 8). The base unit 12 includes a lower housing 24 to which the lower cooking plate 16 is secured by bolts or screws 26 (FIG. 5). The upper unit 14 includes a upper housing 28 to which the upper cooking plate 18 is secured by bolts or screws 26 (FIG. 5). Cast into the upper and lower housing are two horizontal projecting flanges 30 (FIGS. 1 and 3) extending beyond the hinges 20 thereby preventing the user from inadvertently contacting the hinges 20 during use and to act as a vertical stand for space saving storage.

Device 10 includes at least one heating element 32 (FIGS. 5, 8, and 10) operatively coupled to the lower cooking plate 16 for supplying heat to the lower cooking plate 16 and the cooking chamber 22 (FIG. 8). The upper cooking plate 18 may also be heated by another heating element 34 (FIGS. 5, 8, and 10) in a similar manner.

The upper housing 28 and lower housing 24 are preferably made of a heat resistant plastic such as a thermosetting plastic. The upper cooking plate 18 and the lower cooking plate 16 are preferably made of heat conductive metal such as aluminum, steel, or the like.

Figure 9:
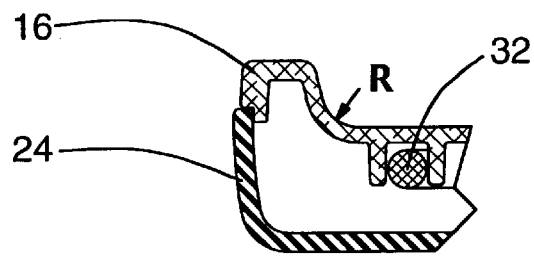
FIG. 9 is an enlarged partial sectional view of the lower cooking plate.

The lower cooking plate 16 (FIG. 2) includes an upward opening, generally flat cooking surface, peripheral walls 36 extending upward and a rim 38 extending about the triangular shaped periphery of the lower cooking plate 16. The surface of the lower cooking plate being made of a non stick metal or coating and having a curved edge (FIG. 9) where the flat surface meets the peripheral walls makes removing foodstuffs and cleaning easy.

The upper cooking plate 18 includes a downward opening, peripheral walls 40 extending downward at a substantial depth, and a rim 42 mirroring the lower rim 38 that when the upper unit 14 is in a closed position meet forming a seal to keep heat within the cooking chamber 22. Attached to the upper housing is a handle 44 (FIGS. 1 and 2) made of heat resistant material, which extends outwardly from the front and facilitates rotating the cooking device from a closed position (FIG. 1) to an open position (FIG. 2) and alternately back to the closed position.

Figure 4:
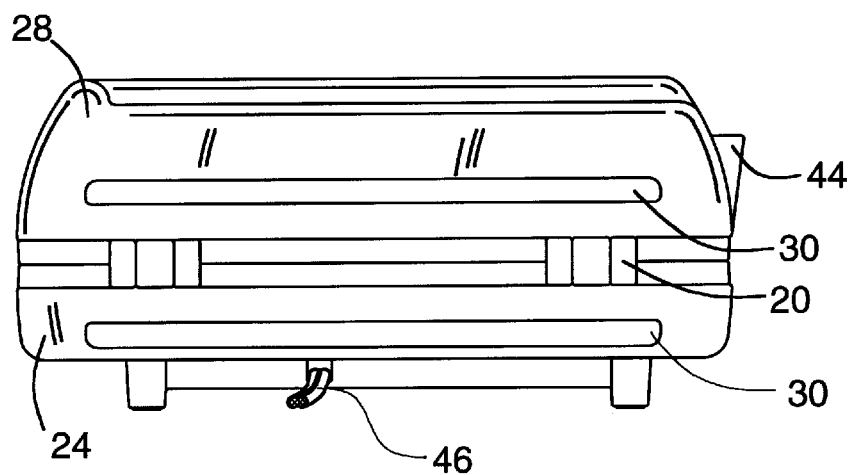
FIG. 4 is a left side elevation of the device.
Figure 6:
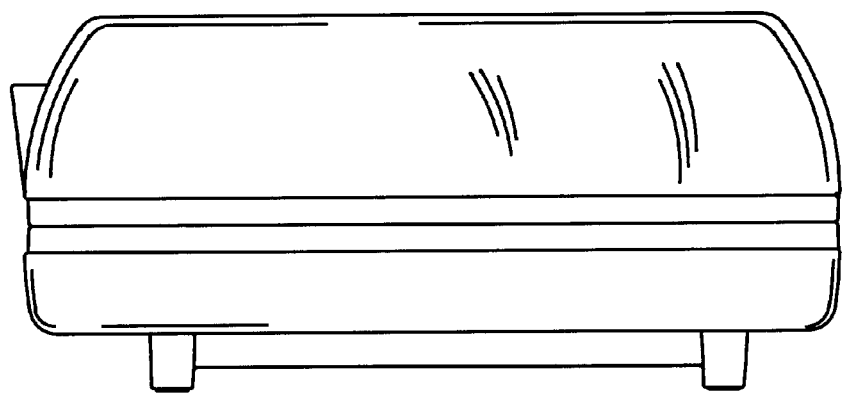
FIG. 6 is a right side elevational view of the device of FIG. 1.
Figure 7:
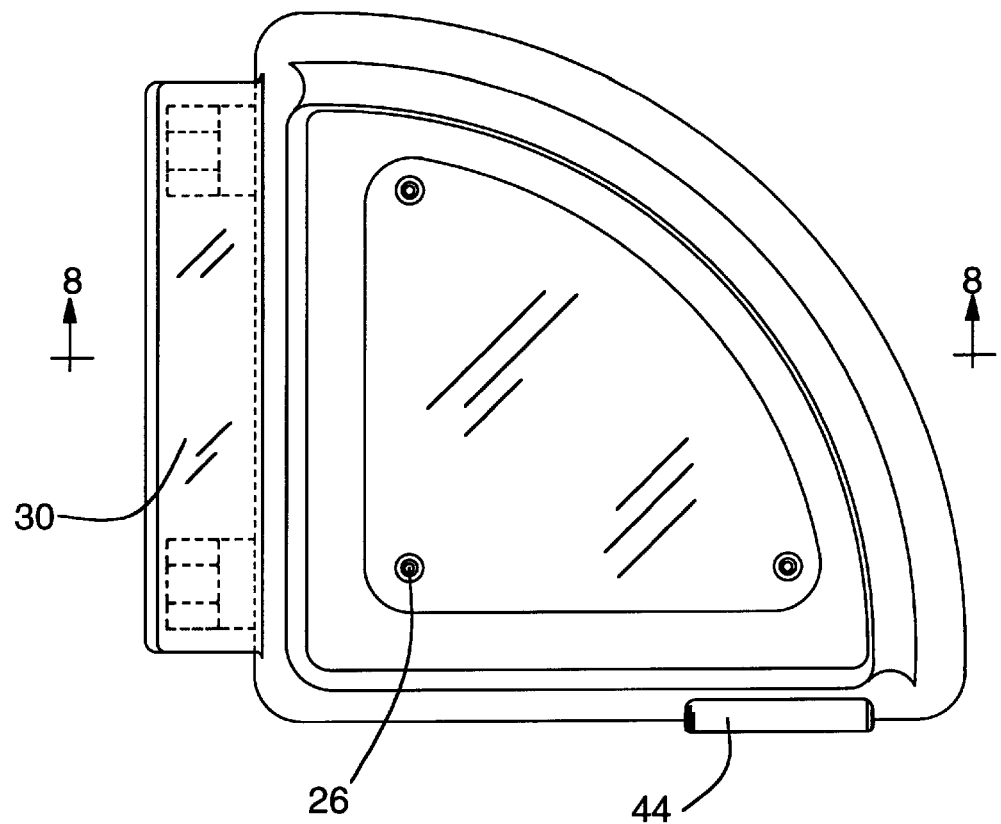
FIG. 7 is a top planar view.

FIGS. 4, 6, and 7 show additional exterior views of the device. FIG. 4 is a left side elevational view showing hinges (20) between the horizontal flanges (30). A electrical cord (46) is attached to the lower housing (24). FIG. 7 is a top planar view again showing hinges (20) in hidden lines within the horizontal flanges (30).

Advantages

From the description above, a number of advantages of our cooking device become evident:

(a) It provides the user with a portable cooking device which will cook for them a single serving of pizza or other foodstuffs that fit within quickly, easily, and economically.

(b) It takes up a small amount of space and can be stored upright, thus allowing people living in a small area such as a college dormitory or one room apartment to be able to cook their favorite foods.

(c) There is a substantial energy savings as it takes a small amount to operate and there is minimal heat given off so as not to heat a room when it is already hot out and possibly air conditioning running.

(d) When only a single serving is cooked each family member can choose their favorite ingredients thus pleasing all.

(e) Children after school can cook their favorite food safely pleasing them and their parents.

(g) There is minimal cleanup required as no extra pans are needed and the nonstick coating can be wiped clean easily.

Figure 10:
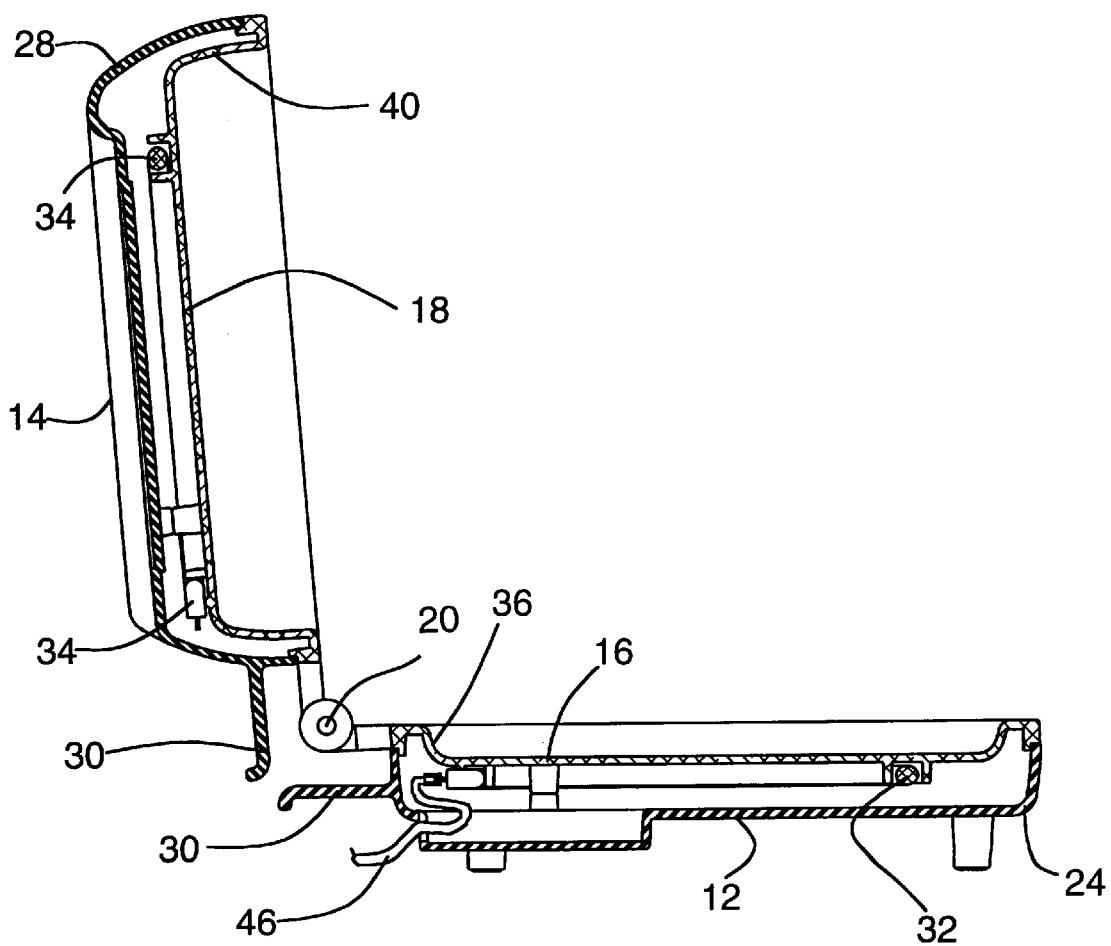
FIG. 10 is a sectional view of the device taken along line 8 in FIG. 7 in an open position.

Operation—FIGS. 1, 2, 10

In operation, the cooker 10 is placed in the open position as shown in FIG. 2 by lifting the handle 44 and upper unit 14. The food to be cooked is placed on the lower cooking plate 16. The upper unit 14 is then pivotally moved to place the cooker back into the closed position. The electrical cord 46 is plugged into a suitable power source (not shown). The lower heating element provides heat to the lower cooking plate 16 and cooking chamber 22. If an upper heating element is provided it heats the upper cooking plate and brings additional heat to the cooking chamber. A thermostat and a regulator (not shown) may be used to control and select the desired temperature. Additionally a timer (not shown) may be added. If a timer control is present in the device, the control is then set for the desired cooking time.

During cooking the lower cooking plate 16 contacts the food directly thereby causing a browning or grilling effect. The heat created in the cooking chamber has a bake-like effect on the remaining surfaces and throughout the food. The compact cooking chamber 22 allows the heated upper cooking plate 18 and lower cooking plate 16 to be disposed in close proximity to the food so that heat transfer from the upper and lower cooking surfaces into the food is very efficient thereby allowing the food to be quickly cooked.

After desired cooking time is expired, the cooking device 10 is disconnected from the power source, and placed in the open position by lifting the handle 44. The cooked foodstuffs can then be removed from the lower cooking plate 16.

Although the triangular shape of the device is especially suited to cook a slice of pizza, many other foodstuffs would cook very well also. Examples would be pot pies, burritos, frozen french fries, most frozen appetizers, and most foods that would fit within the cooking chamber.

Conclusion

Accordingly, the reader will see that the personal pizza cooker of this invention will fulfill a need of an individual or household to be able to cook a small quantity of food quickly, safely, and efficiently. Its compact size permits even the smallest living quarters to be able to prepare hot food when desired. Furthermore, the personal cooker has the additional advantages in that It offers great savings in meals as many frozen pizzas are very inexpensive or could be made from a prepackaged mix thus helping families on a limited food budget;

It will please finicky eaters as each family member can choose their own selection, cook it, and freeze the remainder;

It can be taken with when traveling again creating savings for a family by not having to eat all meals in a restaurant;

It can be placed in a work-place lunch room allowing employees more variety in what they are able to cook and eat for lunch;

It provides tremendous savings in electrical bills as it is much more cost effective to operate than a conventional oven;

It provides children the opportunity to cook their favorite foods after school when parents are not yet at home;

It will work well in RVs and campers giving people more food choices.

It is to be understood that the present disclosure relates to the above described embodiments of the present invention which is for the purposes of illustration only. Numerous modifications and alternative arrangements may be devised by those skilled in the art and that the invention is not limited by the specific embodiment described. For example, the device could be other shapes such as round, oval, or rectangle. It is therefore contemplated to cover by the present invention any and all modifications, variations, or equivalents that fall within the true spirit and scope of the basic underlying principles disclosed herein.

What is claimed is:

1. A device for cooking a single wedge of pizza comprising: a triangular bottom cooking plate having peripheral walls extending upward, a triangular top cooking plate having peripheral walls extending downward, wherein the top cooking plate is movable relative the bottom cooking plate, wherein the top cooking plate closes over the bottom cooking plate to form a closed triangular cooking chamber which holds a single of wedge of pizza, wherein at least one heating element is coupled to the bottom cooking plate to heat the pizza wedge within the cooking chamber.

2. The device of claim 1, wherein the triangular cooking chamber has a perimeter with two straight sides of equal length and a third connecting side which is arcuate.

3. The device of claim 1, wherein a depth of the cooking chamber is such that pizza of various thicknesses can be cooked within the cooking chamber, and wherein the pizza includes various toppings.

4. The device of claim 1, wherein the top and bottom cooking plates comprise a heat conductive metal.

5. The device of claim 1, wherein the wedge of pizza comprises a single slice or one quarter of a frozen whole pizza.

6. A device for cooking a single wedge of pizza comprising: a triangular bottom cooking plate having peripheral walls extending upward, a triangular top cooking plate having peripheral walls extending downward, wherein the top cooking plate is hingedly attached and movable relative to the bottom cooking plate, wherein the top cooking plate closes over the bottom cooking plate to form a closed triangular cooking chamber which holds a single serving wedge of pizza, wherein at least one heating element is coupled to the bottom cooking plate, and wherein the cooking chamber comprises heat conductive metal.

7. The device of claim 6, wherein the peripheral walls of the bottom cooking plate extend upward to form a container wherein cooked sauces and toppings at the edges of the pizza slice are held within.

8. The device of claim 6, wherein a triangular exterior housing is attached to top and bottom cooking plates.

9. A device for cooking a single serving pizza comprising: a triangular bottom cooking plate having peripheral walls extending upward, a triangular top cooking plate having peripheral walls extending downward, wherein the top cooking plate is movable relative the bottom cooking plate, wherein the top cooking plate closes over the bottom cooking plate to form a closed triangular cooking chamber which holds a single serving wedge of pizza, wherein at least one heating element is coupled to the bottom cooking plate to provide heat within the cooking chamber, and wherein a depth of the cooking chamber is such that pizza of various thicknesses can be cooked within the cooking chamber, and wherein the pizza includes various toppings.

10. The device of claim 9, wherein the bottom cooking plate has a first peripheral rim and the top cooking plate has a second peripheral rim which are configured to close against each other and form a seal which retains heat within the cooking chamber.

\* \* \* \* \*